United States Patent [19]

Fuminao

[11] Patent Number: 4,690,184

[45] Date of Patent: Sep. 1, 1987

[54] TREE PRUNING MACHINE

[75] Inventor: Tanitomi Fuminao, Houtaku, Japan

[73] Assignee: Kaisei Kogyo Corporation, Fukuoka, Japan

[21] Appl. No.: 821,642

[22] Filed: Jan. 23, 1986

[30] Foreign Application Priority Data

Apr. 27, 1985 [JP] Japan ................................. 60-92119

[51] Int. Cl.[4] ........................ B27L 1/00; A01G 23/02
[52] U.S. Cl. ..................................... 144/2 Z; 144/336
[58] Field of Search .............................. 144/336, 2 Z

[56] References Cited

U.S. PATENT DOCUMENTS

| | | | |
|---|---|---|---|
| 2,482,392 | 9/1949 | Whitaker | 144/2 Z |
| 3,356,113 | 12/1967 | Perwgia | 144/2 Z |
| 3,364,962 | 1/1968 | Otterbach | 144/2 Z |
| 3,385,332 | 5/1968 | Oherbach et al. | 144/2 Z |
| 3,451,448 | 6/1969 | Michener | 144/2 Z |
| 3,545,509 | 12/1970 | Baxter, Jr. | 144/2 Z |
| 4,527,603 | 7/1985 | Hori | 144/2 Z |

*Primary Examiner*—W. D. Bray
*Attorney, Agent, or Firm*—Townsend and Townsend

[57] ABSTRACT

This invention relates to a tree pruning machine comprising a frame in a cutting unit having a first member mounted to a body having wheels elevating vertically, and a second member projecting from the top of the first member forwardly in an ascent gradient and forming a recess at the front side, the first member having drive wheels mounted on the lower portion thereof and driven by an engine, and a saw chain rotated by the engine through the drive wheels along the frame formed by the first and second members for cutting a branch of a standing tree. Furthermore, the tree pruning machine includes a branch sensing member telescopically provided in the lengthwise direction of the second member of the cutting unit, the front of the sensing member projecting forwardly of the second member for temporarily stopping the drive of the pruning machine toward the upward direction of the standing tree. The sensing member of the pruning machine can reliably sense the branch to be contacted with the top of the cutting unit and the sensing member does not abstract the pruning machine from climbing the standing tree. Thus, the pruning machine can climb the standing tree without fail even when the cutting unit makes contact with the branch of the tree.

2 Claims, 11 Drawing Figures

FIG.1-(A)
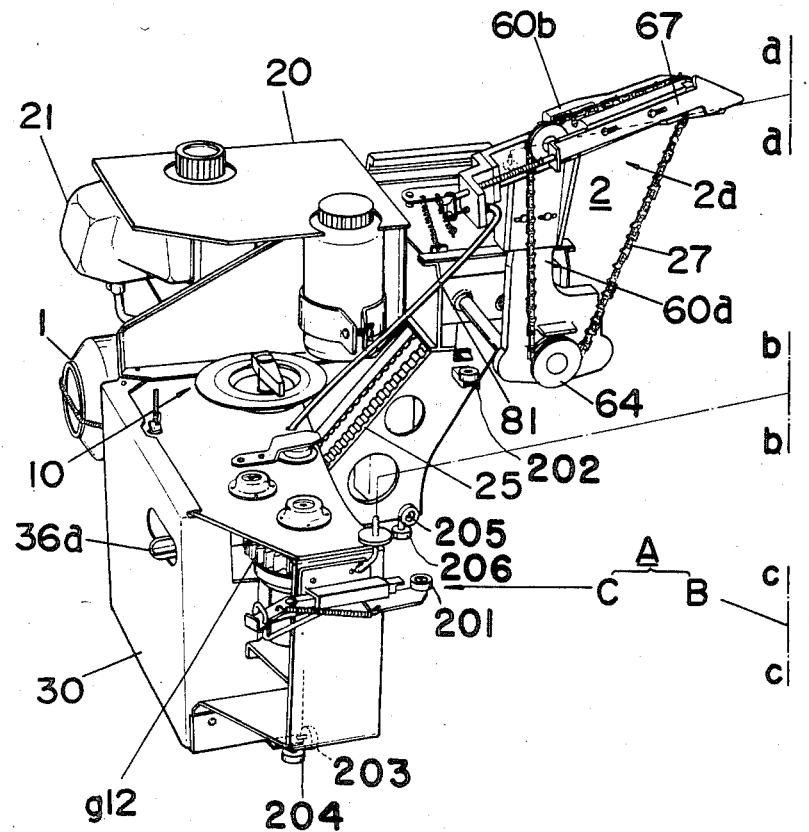

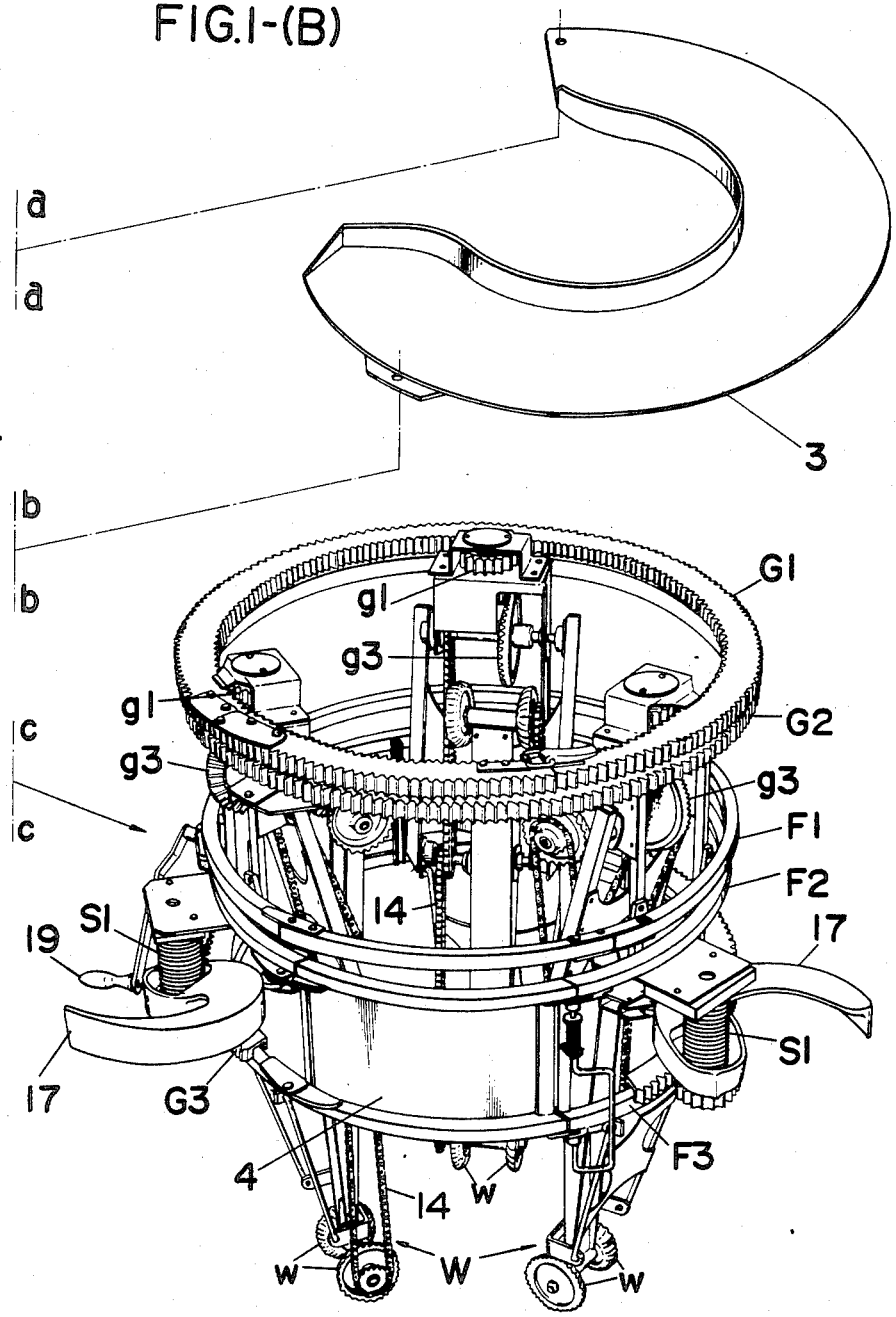

2

TREE PRUNING MACHINE

BACKGROUND OF THE INVENTION a. Field of the Invention

This invention relates to a tree pruning machine and, more particularly, to the structure of a cutting unit for the tree pruning machine.

b. Description of the Prior Art

A tree pruning is necessary for the acceleration of the growth of standing trees, the cultivation of a high-grade timber without a knot, the prevention of a damage by harmful insects or by snow, the effective utilization of a forest or branch pruning. A tree pruning machine for cutting the branches of a standing tree while climbing the tree by its own force is known as a machine for automatically pruning the tree. The tree pruning machine of this type consists of a body having wheels for vertically climbing and descending the tree, and a cutting unit mounted on the body. An engine drives the wheels, and the cutting unit cuts the branches of the tree while the body climbs the tree. The cutting unit cuts the branches projecting from the standing tree from the roots of the branches substantially at the skin of the tree by a saw chain while turning around the tree, and necessitates the following requirements.

(i) The cutting unit does not unnecessarily deform at its frame due to its twisting even if the unit makes contact with a branch having large cutting resistance such as a thick branch or a hard branch.

(ii) Since the frame of the cutting unit slidably contacts the surface of the standing tree, the cutting unit may fail to cut the branch due to excessive friction or defects in the skin of the tree, the frame must slidably contact with the tree as little as possible.

(iii) Since a great load is produced when the frame of the cutting unit makes contact with the branch during cutting, the cutting unit has a structure for contacting with the branch during cutting as little as possible.

(iv) The cutting unit can cut the branch substantially at the surface of the standing tree so as not to allow the remaining branch to occur.

(v) The saw chain of the cutting unit can smoothly turn around the frame of the unit.

(vi) The saw chain of the cutting unit can move in the cutting direction without unreasonable force.

The abovementioned various requirements are all important for the cutting unit of the tree pruning machine, and the cutting unit which does not incorporate the above requirements cannot satisfactorily cut the branches of the tree. Furthermore, in order to prevent the top of the cutting unit from intruding into the branch, the cutting unit has at the top a branch sensing member for effectively interrupting the drive itself in the climbing direction when the sensing member senses the branch. In this case, the sensing member must reliably telescope as predetermined and must not disturb pruning due to the contact with the branch.

SUMMARY OF THE INVENTION

An object of this invention is to provide a tree pruning machine having a cutting unit incorporating all the abovementioned requirements.

According to this invention, a tree pruning machine includes a frame in a cutting unit comprising a first member mounted to a body having wheels elevating vertically, and a second member projecting from the top of the first member forwardly in an ascent gradient and forming a recess at the front side, the first member having drive wheels mounted on the lower portion thereof and driven by an engine and a saw chain rotated by the engine through the drive wheels along the frame formed by the first and second members for cutting a branch of a standing tree. Furthermore, the tree pruning machine includes a branch sensing member telescopically provided in the lengthwise direction of the second member of the cutting unit, the front of the sensing member projecting forwardly of the second member for temporarily stopping the drive of the pruning machine toward the upward direction of the standing tree. When the branch sensing member is thus constructed, the sensing member can reliably sense the branch to be contacted with the top of the cutting unit and the sensing member does not obstruct the pruning machine from climbing the standing tree.

The foregoing objects and other objects as well as the characteristic features of the invention will become more fully apparent and more readily understandable by the following description and the appended claims when read in conjunction with the accompanying drawings.

BRIEF DESCRIPTION OF THE DRAWINGS

FIGS. 1(A) and 1(B) are perspective views of an embodiment of a tree pruning machine according to this invention;

DESCRIPTION OF THE PREFERRED EMBODIMENTS

Figure 2:
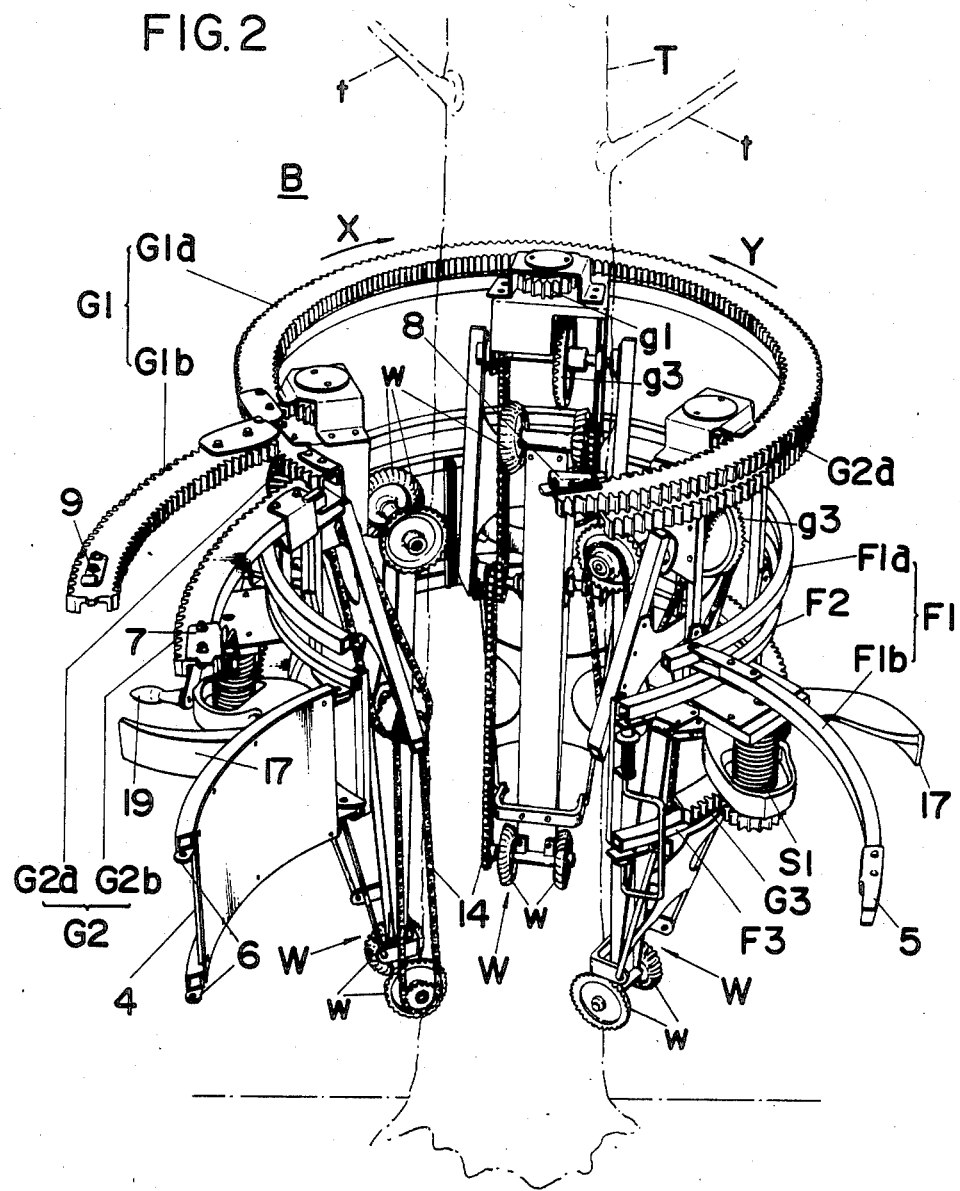
FIG. 2 is a perspective view of a body.

An embodiment of this invention will be described in detail with reference to the accompanying drawings.

FIGS. 1-(A) and 1-(B) are perspective views of the exploded state of an embodiment of a tree pruning machine according to the invention. The tree pruning machine A has an elevating body B detachably set to a standing tree, and a rotary device C detachably mounted on the body B. The body B has a number of elevating wheels w which rotate along the heightwise direction of the standing tree. When the wheels w are driven by an engine 1 carried on the rotary device C, the body B vertically climbs the standing tree. When the body B vertically climbs the tree, a cutting unit 2 having a saw chain 27 cuts the branch projecting from the surface of the standing tree at the root while rotating around the body B. Reference numeral 3 designates a cover plate, which is detachably mounted on the rotary device C. When the machine A cuts the branch while climbing the tree, the cover plate 3 prevents the branches cut by the cutting unit 2 from dropping into the rotary device C and the body B to cause damage to the rotary device C and the body B.

The pruning machine A has the wheels w of the body B and the cutting unit 2 of the rotary device C driven by the engine 1 at the rotary defice C side, and the machine cuts the branches while slowly climbing vertically the standing tree. When the machine A has finished the predetermined cutting works, the machine A rapidly descends vertically along the standing tree.

FIG. 2 is a perspective view of the body B set on the standing tree T and removed from the tree T. The body B has as main frames circular frames F1, F2, F3, on which a variety of components to be described below are respectively mounted. The body B also has a movable large ring gear G1 arranged at the uppermost portion of the body B and formed with teeth on both inner and outer peripheral surfaces. When the pruning machine A climbs the tree T, the ring gear G1 is turned in the direction of an arrow X around the tree T as a center by the drive of the engine 1 to transmit a normal rotation to the respective wheels w. When the pruning machine A descends the tree T, the ring gear G1 is turned in the direction of an arrow Y to reversely rotate the wheels w. The body B also has a stationary large ring gear G2 disposed directly under the ring gear G1 and formed with teeth on the outer peripheral surface. Rotary device C is mounted to body B by placing rollers 201 and 202 within the groove on the underside of ring gear G2 and by placing rollers 203, 204, 205,, and 206 to contact the external surfaces of frame F2.

The ring gear G2 is not turned in the direction of the arrows X and Y as the ring gear G1, but secured fixedly to the frame. When the body B climbs the tree T, the rotary device C cuts the branches t with the cutting unit 2 while rotating along the ring gear G2 in such a manner that the ring gear G2 becomes the rotation guiding locus of the rotary device C. A large arcuate interlocking ring rear G3 is disposed directly above the frame F3 to surround the tree T. Ring gear G3 acts as an interlocking unit for the wheel units W in order to hold the tree at the center of the body B by simultaneously moving the three elevating wheel units W radially of the tree T by equal amounts. The tree T is located at the centers of the frames F1 to F3 and the gears G1 to G3 when the body B is set to the tree T.

The frame F1 has a main frame F1a and a sub frame F1b pivotally connected at an end thereof. When the body B is set to the tree T or removed from the tree T, the frame F1b is opened as shown in FIG. 2. A laterally openable plate 4 is mounted at the frames F2 and F3. When the body B is set to the tree T and removed from the tree T, the plate 4 is opened as shown in FIG. 2. The plate 4 acts as a coupling member of the frames F2 and F3 to rigidly reinforce the frames F2 and F3, thereby preventing the frames F2 and F3 from twisting or deforming.

The rings gears G1 and G2 respectively have main gears G1a, G2a and sub gears G1b, G2b. The sub gears G1b, G2b are pivotally supported at one respective ends to one ends of the main gears G1a, G2a. When the body B is set to the tree T or removed from the tree T, the frame F1b, the plate 4 and the gears G1b, G2b are all opened as shown in FIG. 2 to establish an opening capable of passing the tree T. Thus, the tree T is passed through the opening and disposed at the center of the body B, and the sub frame F1b, then the plate 4 and the sub gears g1b, G2b are all closed as shown in FIG. 1b. Reference numerals 5, 6, 7, 8 and 9 designate stoppers.

Reference character g1 designates a small gear engaged in mesh with the inside of the ring gear G1, characters G2, G3 designate bevel gears, and reference numeral 14 designates a chain. The rotation of the engine 1 is transmitted through the gears g1 to g3 and the chain 14 to the respective wheels w. In FIG. 1A reference numeral 10 designates a climbing height setter of the pruning machine A. Reference numeral 21 designates a gasoline tank, numeral 25 designates a timing belt for transmitting the rotation of the engine 1 to a saw chain 27 of the cutting unit 2, and numeral 30 designates a drive box containing gears to be described later. Numeral 17 designates cams for biasing the wheels W toward the central direction of the standing tree T, character S1 designates a coiled spring mounted on the rotational shaft of the cams 17, and numeral 19 designates an operating handle for expanding the cams 17.

Figure 3:
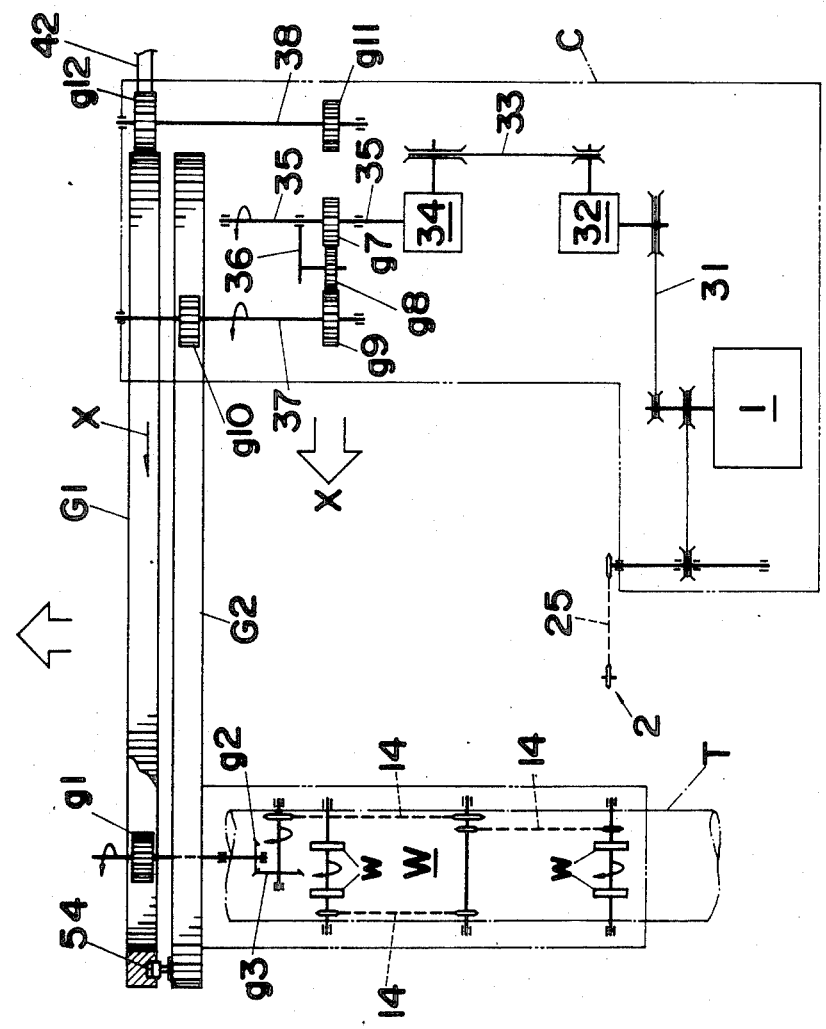
FIGS. 3 and 4 are developed views of a transmission.
Figure 4:
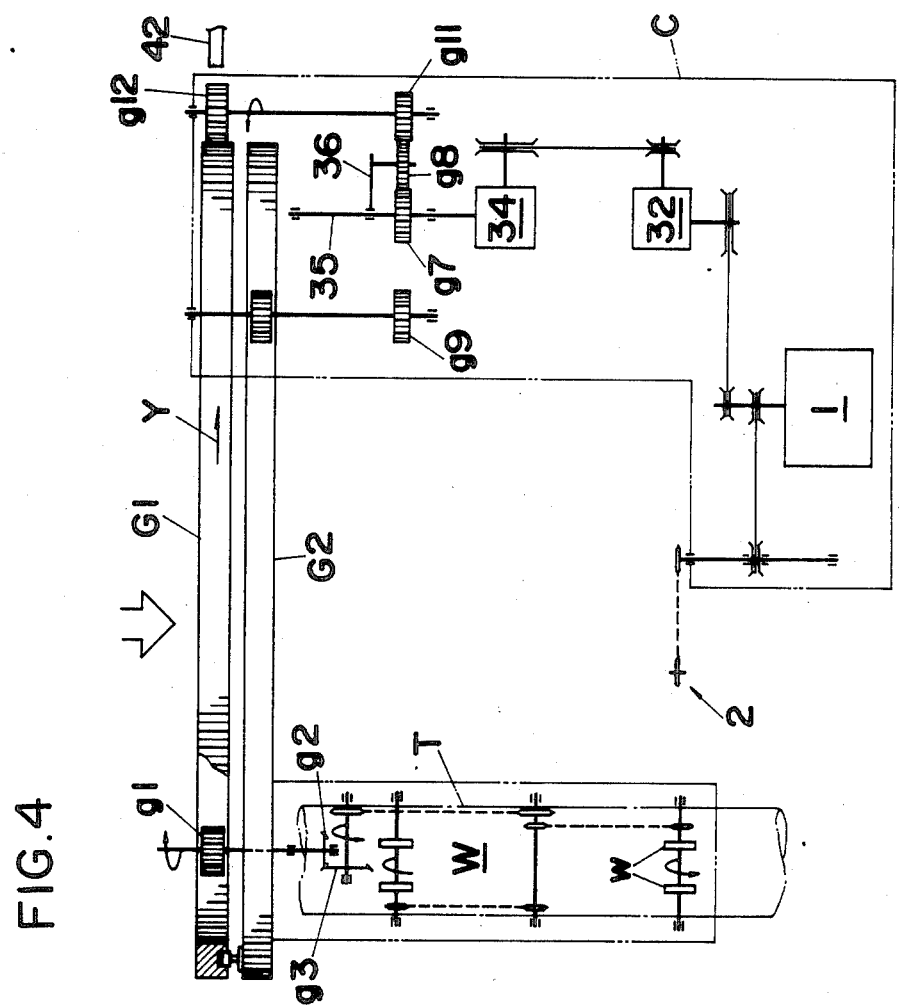

FIGS. 3 and 4 are developed views of a transmission, and the transmission will be described with reference to FIGS. 3 and 4.

Reference character g2 designates a gear disposed between the gears g1 and g3. The rotation of the engine 1 is transmitted through the gears g1 to g3 and the chain 14 to the wheels w. Numerals 31 and 33 designate transmission belts, and numerals 32 and 34 designate reduction gears. The rotation of the engine 1 is transmitted through the belts 31, 33 and reduction gears 32, 34 to the wheels w.

Reference character g7 designates a gear driven by the reduction gear 34, and characters g9 and g11 designate gears disposed at both sides of the gear g7. A gear g10 engaged in mesh with the gear G2 is coupled with the gear g9. Reference character g8 designates a movable gear, which is supported by a rotatable lever 36 and engages in mesh with the gears g7 and g9 when the tree pruning machine A climbs the standing tree T. (FIG. 3) In other words, the rotation of the engine 1 transmitted to the gear g7 is transmitted through the gears g8, g9 to a gear g10 and gear g10 rolls along the gear g2. The rotary device C rotates around the body B in a direction of an arrox X to cut the branch t with the saw chain 27. In this case, a gear g12 is stopped in rotation by an anchor plate 42 is engaged in mesh with the gear G1, the gear G1 is towed by the gear g12 to rotate in a direction of an arrow X. The rotation of the gear G1 is transmitted through the gears g1 to g3 and the chain 14 to the wheels w, which thus normally rotate, thereby allowing the tree pruning machine A to climb on the standing tree T.

When the tree pruning machine A descends the standing tree T, the gear g engages in mesh with the gears g7 and g11 (FIG. 4). The rotation of the engine 1 is not transmitted to the gear g9 in this state, the anchor plate 42 is separated from the gear g12, and the pruning machine A descends by its own weight on the tree T. In this case, the gear G1 reversely rotates the wheels w and rotates in a direction of an arrow Y. Thus, the anchor plate 42 is a unit which operates to interrupt the power for interrupting the drive of the wheels w in the direction for climbing on the standing tree.

Climb and descend switching means of the transmission will be described with reference to FIGS. 5 and 6.

Figure 6:
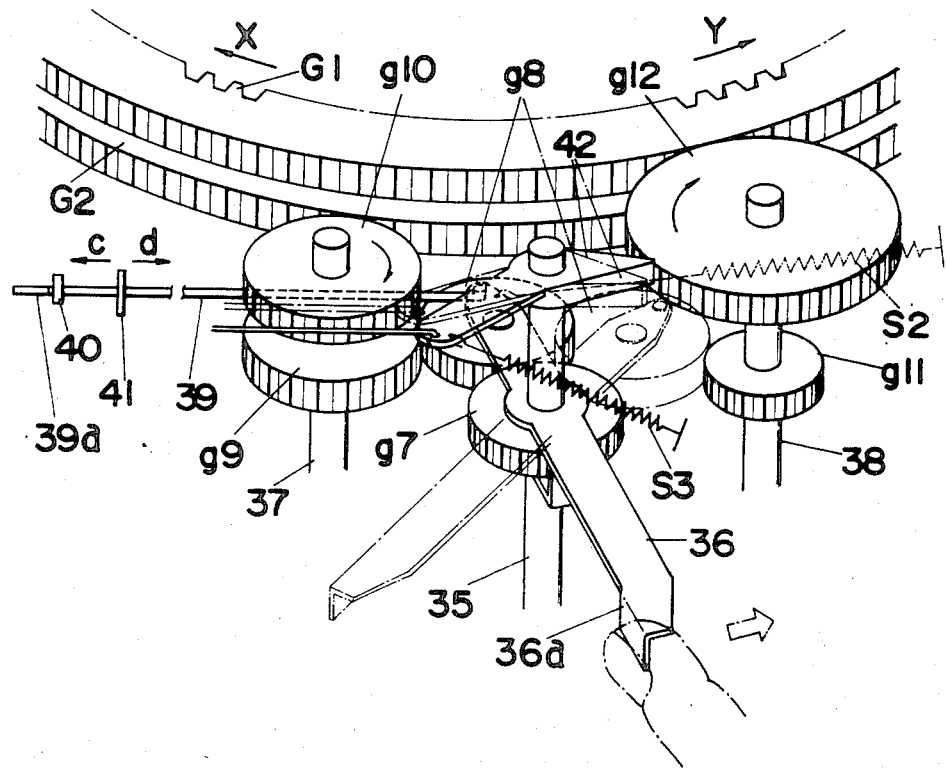
FIG. 6 is a partial perspective view of the transmission.
Figure 7:
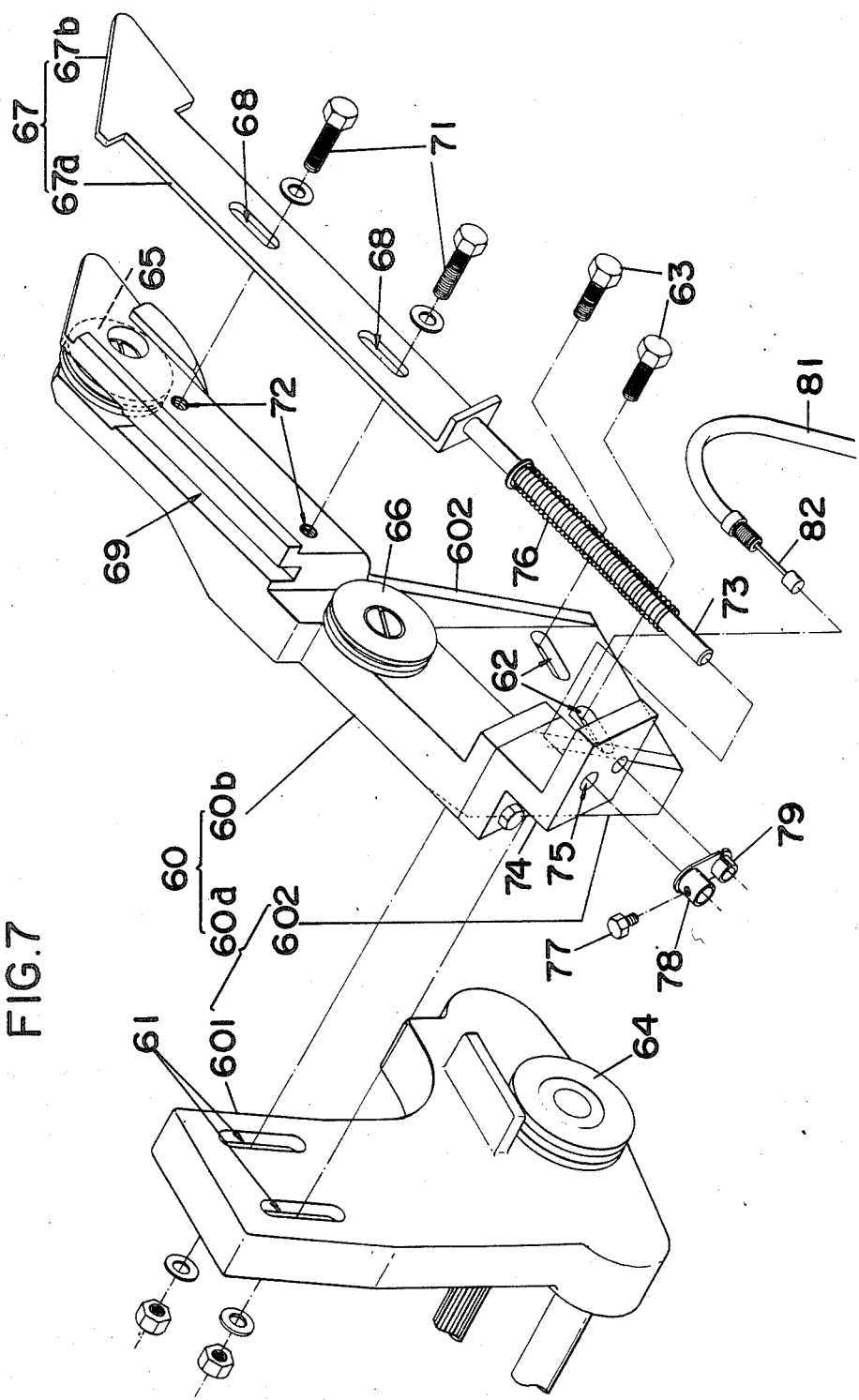
FIG. 7 is an exploded view of a cutting unit.

In FIG. 6, reference numeral 35 designates a rotational shaft of the gear g7. Numeral 36 designates a rotatable lever movably mounted on the shaft 35 directly above the gear g7, the end of which extends to the side of the gears G1, G2, and the rear end of which becomes an operation unit 36a. The operation unit 36a is exposed from the box 30 (FIG. 1), and can be rotated by a finger. The gear g8 is mounted on the lever 36, and is engaged in mesh with the gear g7 (FIG. 3). In other words, the gear g8 is driven through the gear g7 by the engine 1. Rotational shafts 37 and 38 are disposed at both sides of the shaft 35, and the gears g9, g10 and g11, g12 are respectively mounted on the shafts 37 and 38.

As described above, the gear g10 is engaged in mesh with the gear G2, and the gear g12 is engaged in mesh with the gear G1.

A tension spring S2 is mounted on the end of the lever 36 for biasing the gear g8 toward the gear g11 side by the tension of the spring S2. A switching lever 39 is mounted as a rotating direction switching unit of the wheels w on the end of the lever 36. In FIG. 6, the operation unit 36a is operated by a finger to rotate the lever 36 counterclockwise against the tension of the spring S2. Then, the engaging portion 39a of the lever 39 at the end is engaged with a projection 40, the gear g8 is engaged in mesh with the gear g9, the rotation of the gear g8 is transmitted to the gears g9, g10 as described above, and the gear g10 rotates clockwise. Reference numeral 41 designates a guide member of the lever 39.

Reference numeral 42 designates anchor plate as a power interrupting member mounted on the shaft 35, and a compression spring S3 for energizing the anchor plate 42 clockwise in FIG. 6 is mounted on the rear end of the anchor plate. The tension of the spring S2 is larger than that of the spring S3. The anchor plate 42 rotates together with the lever 36, the end of the gear g8 is engaged in mesh with the gear g12 when that the gear g8 is engaged in mesh with the gear g9, thereby stopping rotating of the gear 12 as described above (FIG. 3). As described above, the gear G2 is fixed to the frame, and does not rotate. Accordingly, when the gear g10 rotates clockwise by the drive of the engine 1 as described above, the gear g10 rotates along the gear G2 in the direction of arrow X while engaging in mesh with the gear G2 fixed to the frame, and the rotary device C provided with the gear g10 rotates around the gear G2 (i.e., around the standing tree T) in the same direction, thereby cutting the branch t with the cutting unit 2. When the body B climbs on the standing tree T, the rotary device C cuts the branch t projected from the standing tree T while rotating around the body B.

When the gear g10 rotates around the gear g2 while rotating, the gear g12 is prevented from rotating by anchor plate 42 as described above. Thus, the gear G1 engaging in mesh with the gear g12 is towed by the gear g12 and rotates in the direction of arrow X around the tree T together with the gear g10. The gear g1 is engaged in mesh with the inside of the gear G1 as described above. Thus, when the gear G2 is towed by the gear g12 and rotated in a direction of an arrow X, the gear g1 rotates, and the rotation of the gear g1 is transmitted through the gears g2, g3 and the chain 14 to the wheels w, which thus rotate while compressed on the standing tree T, and the body B climbs the tree T. Simultaneously, the rotary device C rotates around the body B as described above, thereby cutting the branch t to the cutting unit 2.

Figure 5:
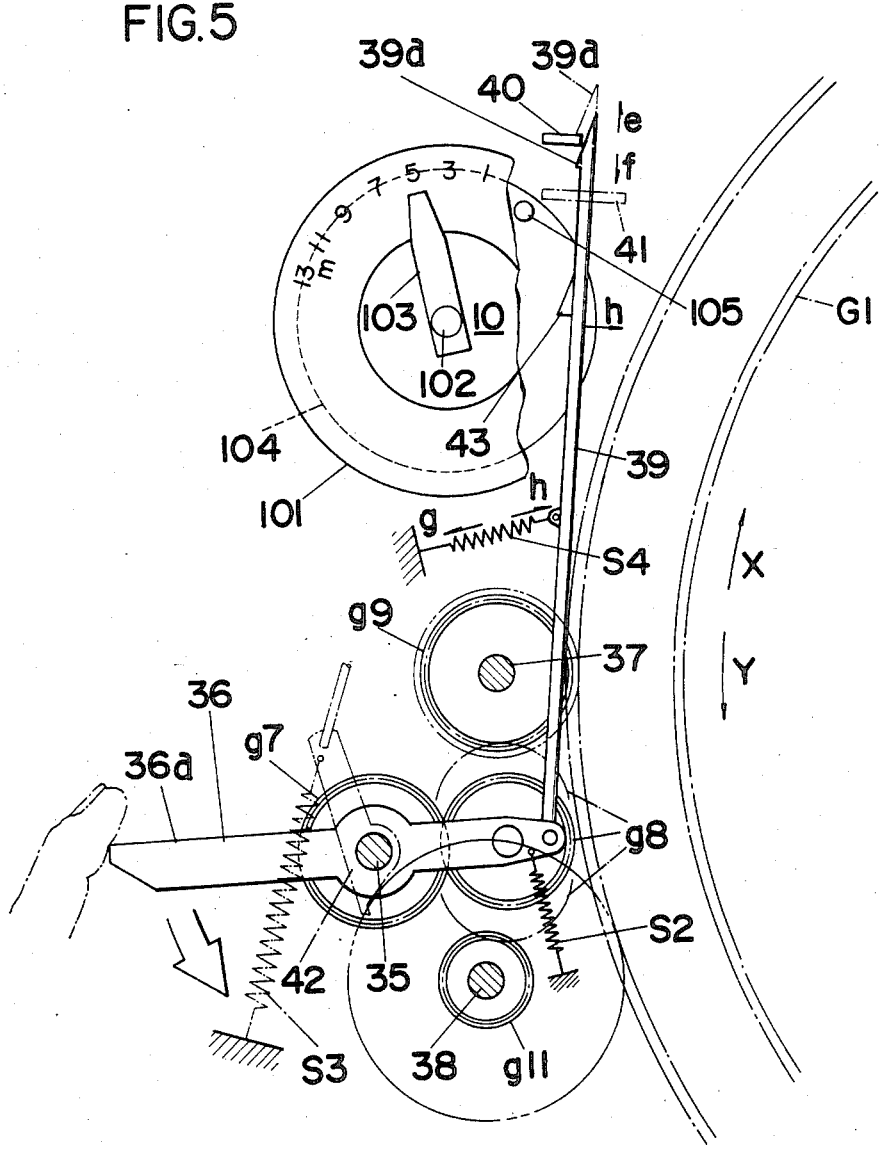
FIG. 5 is a partial plan view of the transmission.

In FIG. 5, reference numeral 10 designates a climbing height setter of the tree pruning machine A provided in the box 30, and the setter 10 has a dial plate 101, a dial knob 103 mounted on a rotational shaft 102 at the center of the plate 101, and spiral springs and gears (not shown) arranged in the box 30. Setting heights (meters) are marked by numerals (1 to 13) on the upper surface of the plate 101. When the knob 103 is held by the finger and rotated counterclockwise against the tension of the spiral spring in the box 30, the end is matched to the desired numeral (e.g., 5 m as shown) and when the knob 103 is isolated from the finger, the knob 103 slowly rotates clockwise by the tension of the spiral spring.

Setter 10 is typically a spiral spring type clock of well known construction and, since such clocks have a number of spiral springs and gears associated therewith, a detailed description of its structure shall be omitted.

Reference numeral 39 designates the switching lever which becomes the normal and reverse rotating direction switching unit of the wheels w, and the lever 39 is journaled at one end to the end of the lever 36. The projection 39a is projected from the end of the lever 39. When the operation unit 36a is manually operated as described above to move the lever 39 in the direction of an arrow e and to secure the projection 39a to the projection 40 on the frame, the gear g8 rotates around the shaft 35 meshes with the gear g9 (designated by a chain line in FIGS. 3 and 5) as described above, the normal rotation is transmitted to the wheels w, and the pruning machine A climbs the tree T.

Since The lever 39 is biased by the tension of a spring S4 toward the setter 10 (in the direction of an arrow g), the projection 39a remains secured to the projection 40, and holds the state that the rotation of the gear g9 is transmitted to the wheels w.

A disc 104 rotates together with the knob 103, and a projection 105 projects from the upper surface of the disk 104. When the knob 103 is rotated to be set to the desired height as described above, the knob 103 and the disk 104 rotate slowly clockwise by a principle of a spiral spring type clock. When the pruning machine A climbs to the set height, the projection 105 makes contact with the projection 43 to push the lever 39 in the direction of an arrow h. Then, the projection 39a is separated from the projection 40, the lever 39 is pulled by the tension of the spring S2 in the direction of an arrow f, the gear g8 is rotated clockwise around the shaft 35 by the tension of the spring S2, isolated from the gear g9, and engaged in mesh with the gear g11. At this time, the anchor 42 rotates clockwise together with the plate 36, away from the gear g12, and the gear g12 is allowed to rotate (FIG. 4).

Then, the cutting unit 2 will now be described in detail with reference to FIGS. 7 to 10.

Reference numeral 60 designates a frame having a substantially inverted L shape which becomes a main body of the cutting unit 2. Frame 60 has a first member 60a mounted to the rotary device C as shown in FIG. 1a, and a second member 60b projecting from the top of the first member 60a forwardly slightly in an upward gradient in such a manner that the front side forms a recess 2a. When the frame 60 is formed with the member 60b projected forwardly in a slightly upward gradient, the frame 60 is prevented from deforming due to twisting even if the top of the cutting unit 2 makes contact with the branch t.

The first member 60a is divided into lower and upper halves 601 and 602, which are respectively formed with longitudinally and laterally extending holes 61, 61 and 62, 62 in such a manner that the halves 601 and 602 are coupled by bolts 63, 63. The halves 601, 602 can adjust the tension of the saw chain 27 by elevationally and laterally relatively sliding themselves by loosening the bolts 63, 63.

Figure 8:
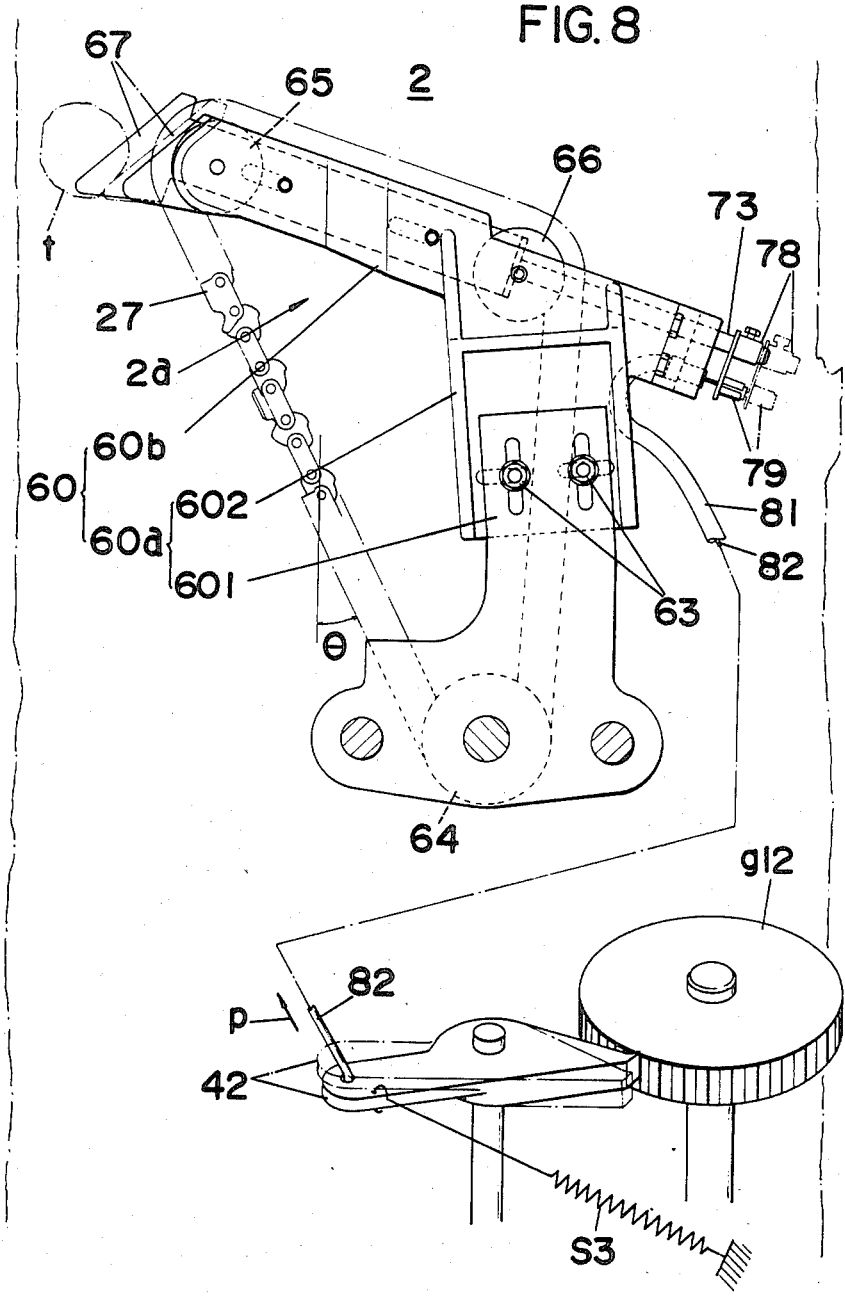
FIG. 8 is a side view in the assembled state.
Figure 9:
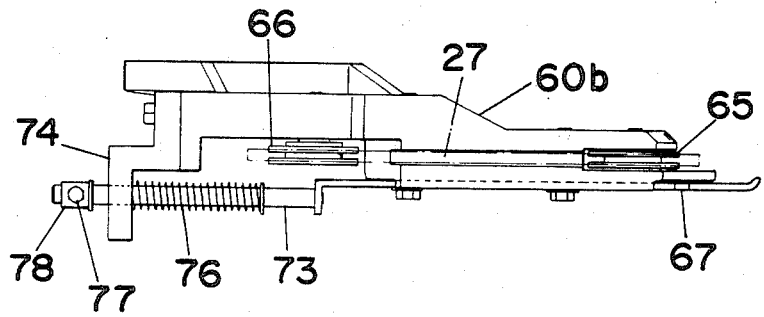
FIG. 9 is a plan view of the cutting unit.

A drive wheel 64 driven by the engine 1 is mounted on the lower portion of the lower half 601. Rotatable wheels 65, 66 are mounted as guide members on the front and rear ends of the second member 60b, and the saw chain 27 is engaged with the drive wheel 64 and the wheels 65, 66. Reference numeral 69 designates a guide groove for the saw chain 27 recessed on the upper surface of the second member 60b. When the saw chain 27 is engaged in this manner, the saw chain 27 moves at an angle θ the vertical as shown in FIG. 8. Thus, the saw chain 27 smoothly cuts the branch t. a nonrotary guide member may be provided instead of the wheel 66.

Reference numeral 67 designates a branch sensing member for preventing the branch t from making contact with the top of the cutting unit 2. Sensing member 67 comprises a long rectangular plate 67a, and an acute contact 67b of substantially triangular shape formed at the end of the long plate 67a. The sensing member 67 is telescopically mounted in the lengthwise direction of the second member 60b via bolts 71 threaded into threaded holes 72., and the contact 67b of the front portion of the member 67 is projected forwardly of the second member 60b. Reference numerals 68, 68 designate long holes.

Reference numeral 73 designates a long lever mounted at the rear end of the sensing member 67. lever 73 is telescopically mounted in the hole 75 of the bendable portion 74 of the rear end of the second member 60b. Numeral 76 designates a spring movably mounted on the lever 73. Numeral 78 designates a tube mounted on the rear end of the long lever 73 via a threaded screw 77. Numeral 79 designates a collar mounted below the tube 78, and one end of a wire 82 contained in a bendable pipe 81 is mounted in the collar. The other end of the wire 82 is coupled with the anchor plate 42. When the branch t makes contact with the end of the sensing member 67, the sensing member 67 is depressed by the branch, moved backwardly (chain line in FIG. 8), the wire 82 is pulled in a direction of an arrow p, the anchor plate 42 is rotated clockwise, the end of the anchor plate is separated from the gear g12, and the tree pruning machine A descends on the standing tree T by its own weight, but when the branch t separates from the sensing member 67, the sensing member 67 again projects forwardly by the tension of the spring 77, the anchor plate 42 is again engaged with the gear g12, and the pruning machine A again climbs on the tree T. Thus, the sensing member 67 reliably moves backwardly when making contact with the branch to to stop transmitting of the power to the wheels w, thereby allowing the pruning machine A by its own weight. This prevents the branch from contacting the top of the cutting unit 2 and preventing the pruning machine A from climbing the tree.

Figure 10:
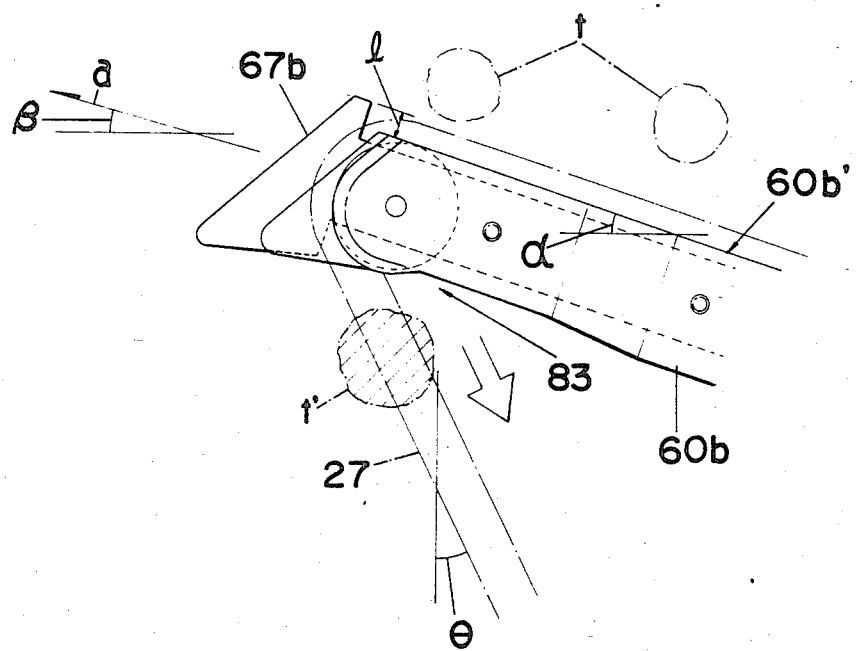
FIG. 10 is a partial side view of the cutting unit.

As shown in FIG. 10, the inclining angle α of the upper surface 60b' of the second member 60b is slightly larger than the climbing angle β of the cutting unit 2 in the climbing direction a. This prevents the branch t disposed above the cutting unit 2 from making contact with the upper surface 60b' and causing unnecessary friction between the second member 60b and the branch t. The second member 60b is formed with a smooth recess 83 at the rear of the saw chain 27 under the second member 60b. This prevents the saw chain 27 from being disturbed in the cutting work due to the contact of the branch t' during cutting by the saw chain 27 with the lower side of the second member 60b. Further, the top of the sensing member 67 is projected upwardly at a small interval l from the top of the second member 60b. This prevents the cutting unit 2 from being obstructed when moving forward due to the contact of the branch t with the end of the second member 60b.

The tree pruning machine A of this invention is constructed as described above, the body B is set onto the standing tree T, the rotary device C is mounted on the body B, the climbing height setter 10 is operated to set the climbing height, and the lever 36 is shifted to the climbing side. Then, the engine 1 is started. Thus, the wheels w normally rotate, the pruning machine A slowly climbs on the standing tree T, and the branch t is cut by the cutting unit 2 which turns around the standing tree T. When the pruning machine A climbs to the set height set by the setter 10, the switching lever 39 is pressed by the pin 105 in a direction h as described, the engaging portion 39a of the lever 39 separates from the projection 40, the gear g8 engaged in mesh with the gear g9 so far is rotated around the shaft 35 as a center and engaged in mesh with the gear g11 by the tension of the spring S2, the rotary drive of the engine 1 to the wheels w is transmitted, and the pruning machine A descends on the tree T.

This invention is not limited to the particular embodiment described above. Various other changes and modifications may be made within the spirit and scope of the invention. For example, the frame may be formed at least of the abovementioned first and second members, and may also include an arbitrary member such as as reinforcing rib in addition to the first and second members.

According to this invention as described above, the second member 60b for forming the frame 60 is formed in the shape for projecting toward the climbing direction a of the tree pruning machine A. Thus, the strength of the member in that direction is extremely high, and even if a branch having large cutting resistance such as a thick branch or a hard branch makes contact with the top of the cutting unit 2, the frame 60 is hardly deformed due to twisting. When the side of the frame 60 is slidably contacted with the surface of the standing tree T, an unnecessary slidably contacting friction often occurs to disturb cutting the branch or damages the skin of the standing tree, but since the frame 60 is formed in the shape having the recess 2a as described above, the unnecessary slidably contacting friction between the frame and the standing tree T is avoided. Further, the configuration can also prevent the frame 60 from producing an unnecessary load due to the contact with the branch t during cutting by the saw chain 27. Further, recess 2a allows the saw chain 27 to approach closely the surface of the tree T for cutting the branch t substantially along the surface of the tree T. Moreover, since the saw chain 27 can smoothly move along the frame 60, and can move downwardly at an inclined angle θ at the front side of the frame 60, the pruning machine can cut the branch t without difficulty. In addition, the branch sensing member 67 does not interfere with the cutting of the branch by the cutting unit 2, and when the sensing member 67 makes contact with the branch t, it stops the drive of the machine A in the climbing direction of the standing tree to prevent the top of the cutting unit 2 from making contact with the branch. Thus, the cutting unit 2 according to this invention has excellent advantages as described above, and one can expect a sufficiently satisfactory pruning operation.

What is claimed is:
1. A tree pruning machine comprising:
a body;
a plurality of wheels connected to the body for elevating the body vertically on a tree;
a cutting unit connected to the body;
an engine;

means, connected to the engine and to the plurality of wheels, for driving the wheels with the engine;

means, connected to the engine and to the cutting unit, for driving the cutting unit with the engine;

wherein the cutting unit includes:
- a first member connected to the cutting unit and extending generally vertically therefrom;
- a drive wheel mounted on a lower portion of the first member, the drive wheel being connected to the cutting unit driving means;
- a second member connected to the top of the first member, the second member extending in a forward direction and having an upward gradient for forming with the first member a recess therebetween; and
- a saw chain engaging with the drive wheel and the second member.

2. The tree pruning machine according to claim 1 further comprising:
- a branch sensing member connected to the second member and having a portion projecting forwardly of the second member, the branch sensing member being capable of movement in a backward direction when contacting a branch; and
- means, connected to the branch sensing member and to the wheel driving means, for interrupting the driving of the wheels by the engine when the branch sensing member contacts a branch.

* * * * *